Sept. 1, 1931.     C. D. AMMON     1,821,370
CULTIVATOR
Filed March 10, 1930     2 Sheets-Sheet 2

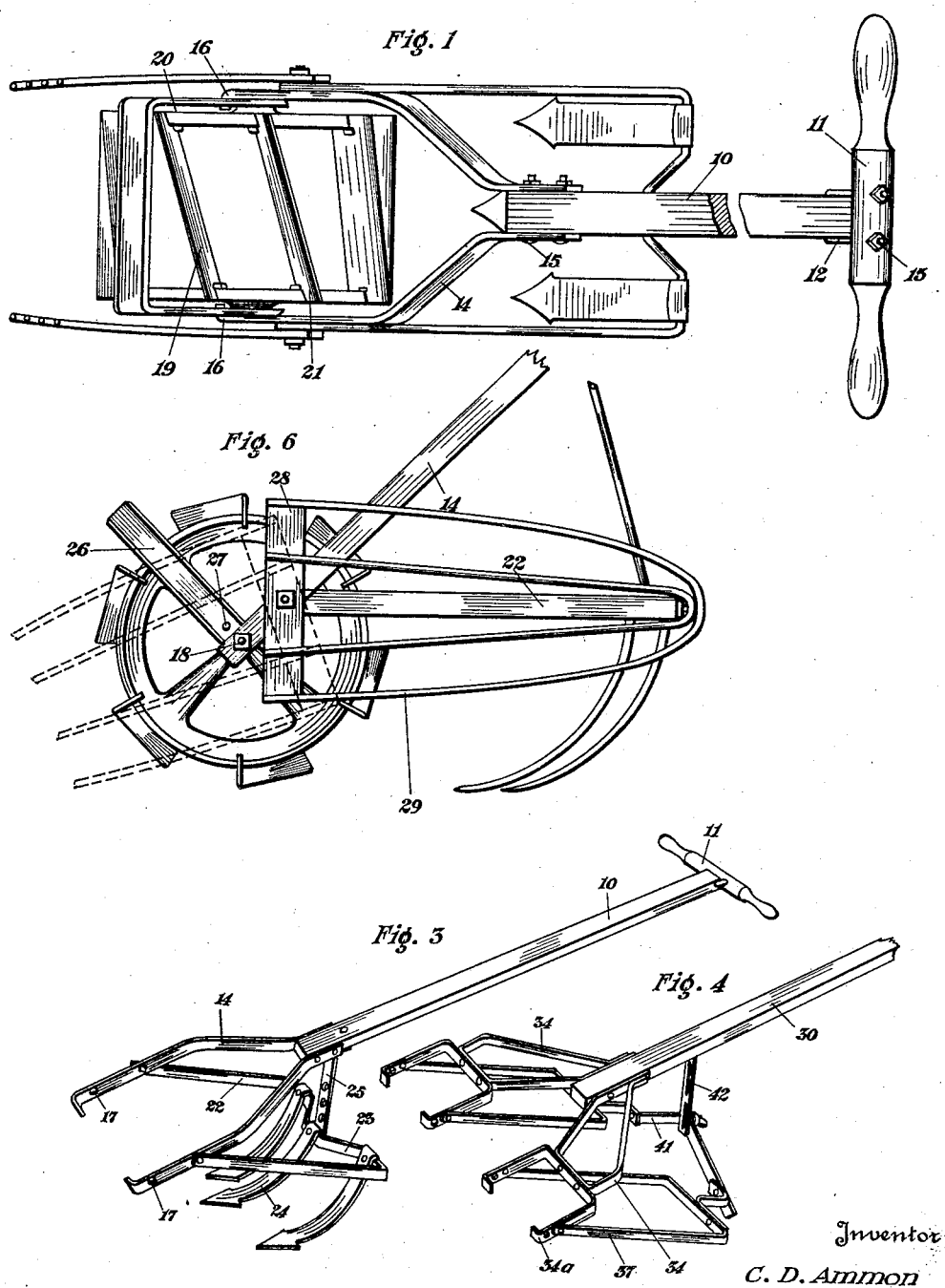

Inventor
C. D. Ammon

By Emil F. Lange
Attorney

Patented Sept. 1, 1931

1,821,370

UNITED STATES PATENT OFFICE

CHARLES D. AMMON, OF LINCOLN, NEBRASKA

CULTIVATOR

Application filed March 10, 1930. Serial No. 434,782.

My invention relates to combined cultivators, weed killers and mulchers, its object being the provision of an improvement in the cultivators at present in use.

Another of my objects is the provision of a soil working implement which is adapted to be operated in either direction.

Another of my objects is the provision of a rotary chopping reel combined with a cultivator for scarifying the soil immediately after the hoe has broken the soil crust.

Another of my objects is the provision of a flat bladed hoe which is adapted to follow the rotary chopping reel, the flat bladed hoe being beveled and sharpened on both of its edges so that it may be reversed in the implement.

Another of my objects is the provision of a chopping reel which is adapted to be positioned in either direction with either the flat bladed hoe or the cultivating shovels in the rear of the rotary chopping reel and with leaf guards which are adjustable into operative position for either direction of travel of the rotary chopping reel.

Another of my objects is the provision of an improved form of leaf guard which more effectively protects the plants in adjacent rows and prevents their being cut by the soil working tools.

Having in view these objects and others which will be pointed out in the following description, I will now refer to the drawings, in which Figure 1 is a plan view of the implement with the single form of rotary chopping reel.

Figure 3 is a view in perspective of the frame of the single rotary chopping reel.

Figure 4 is a similar perspective view of the frame of the double rotary chopping reel.

Figure 6 is a side elevational view of a portion of the implement showing particularly the form of the leaf guard.

Figure 5:
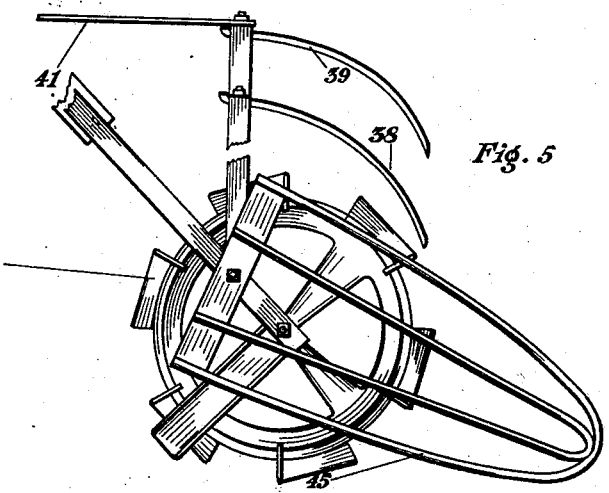
Figure 5 is a side elevational view of the rotary chopping reel, a portion of the handle being broken away.

The implement handle is designated by the numeral 10. This is provided with the usual cross arm 11 which is anchored to the end of the handle 10 by means of the U bolt 12 passing through the cross arm 11 and the handle 10 and secured thereto by means of a pair of nuts 13.

In the single form of hoe as shown in Figures 1 and 3, a pair of diverging straps 14 is secured to the handle 10 at its lower extremity by means of bolts 15. The diverging metal straps are slightly inturned at their lower extremities at 16. The straps 14 are provided with apertures 17 which serve as bearings for the axle 18 of the rotary hoe 19.

The rotary chopping reel itself includes a pair of spaced spiders 20 which are rotatably mounted on the axle 18. The two spiders are also held in rigidly spaced apart relation by means of any suitable braces and by the chopping blades 21 which are secured at their extremities to the peripheral portions of the spiders 20, the blades being anchored in the spiders as shown in Figure 5 or secured thereto by any other suitable means. These blades are inclined with reference to the axle 18. It is apparent that the motion of the implement will cause the rotary chopping reel to revolve about its axis and to break up the crust of the soil. Since the blades 21 are inclined, their forward ends will engage the soil first so as to produce an oblique cut in the soil crust, the soil crust being further broken up by other blades 21 which engage it. The blades may, however, be positioned in parallelism with the reel axis. It will also be apparent that the implement may be pushed or pulled in either direction and that the blades will operate in an equally effective manner regardless of the direction in which the implement is pushed or pulled. For this reason the blades 21 have their cutting edges beveled on both sides as shown in Figure 5.

The cultivator shovel frame is in general in U form consisting of a single strap having side members 22 connected with a transverse portion 23 at the rear. The portion 23 is preferably turned in at its middle point as shown in Figure 3 in order to provide the desired off-set relation between the cultivating tools 24 in the manner shown in Figure 3.

The side members 22 are rigidly secured to the straps 14 at points above the bearings 17 but they may also be secured through the bearings. In order to make this connection more rigid, a brace 25 connects the rear member 23 with the handle 10. The connection between the brace 25 and the handle 10 is a fixed connection but the lower connection is releasable by means of a bolt, the strap 25 being provided with a plurality of apertures as shown in Figure 3 for adjusting the inclination of the handle 10. If the implement is then used with the parts in the position shown in Figures 5 and 6, the rotary chopping reel will first break up the soil crust and the cultivating shovels 24 will then follow to stir up the surface soil and to produce a dust mulch by reducing the broken up surface crust.

The flat blade of the hoe 26 is U-shaped, its end portions being rigidly secured to the axle 18. The hoe 26 is beveled and sharpened on both of its edges throughout its entire length. Since the connection of the hoe 26 with the axle 18 is a releasable one, it is possible to remove the hoe 26 when one edge becomes dull and to reverse its position in the implement so as to bring the new edge into play. This hoe 26 is brought into play only by turning the handle 10 about its axis with the rotary hoe 19 so as to raise the cultivating shovels and so as to lower the hoe 26 until it is in engagement with the surface of the soil. The implement will then rest on the blades of the rotary chopping reel and on the transverse edge of the flat hoe 26. The pushing of the implement with the hoe 26 in the rear will then cause the rotary chopping reel to perform in its usual manner after which the flat hoe shaves the upper portion of the soil and destroys all weeds in its path. The transverse portion of the hoe 26 is necessarily spaced from the rotary hoe but an adjustment is provided which permits changes in the position of the hoe 26 so that it is either nearer to or farther away from the rotary hoe. This adjustment includes a plurality of apertures 27 or slots in the side members of the hoe 26 and through which the hoe 26 is adapted for attachment to the axle 18.

The leaf guards are in the form shown in Figure 6. They include straps 28 which are pivotally secured to the implement, preferably either at the points where the arms 22 are secured to the straps 14 or at the axis of the reel. Each strap has secured thereto a plurality of U-shaped members 29 which have sufficient length so that they will function readily in keeping the leaves or other parts of the plants in the adjacent rows away from the soil working tools. Since the connection of the straps 28 with the implement frame is a pivotal connection, the leaf guards 29 may readily be turned into either of two positions to protect the adjacent plants from either the cultivating tools 24 or the hoe 26.

The free ends of the leaf guards 29 are slightly inturned and since their material is resilient they may readily be latched into inoperative position when so desired.

Figure 2:
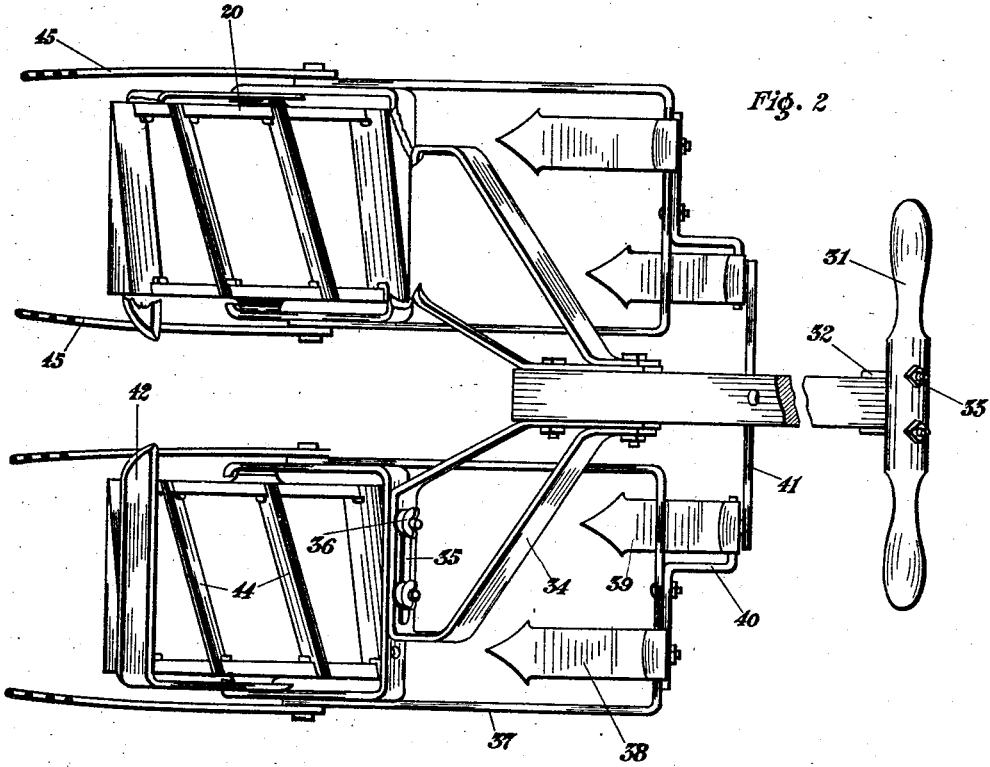
Figure 2 is a plan view showing the double form of my rotary chopping reel.

The rotary chopping reel is adapted for use between two adjacent rows of plants but it is not adapted to straddle a row of plants. The modification contemplated in my Figures 2 and 4 adapts this implement for such use. The only modification is in the implement frame shown in Figure 4, the structure of the rotary chopping reel and of its frame being the same as that for the single hoe. The handle 30 and the cross arm 31 correspond to the handle 10 and the cross arm 11. The fastening means comprising the U bolt 32 and the nuts 33 are identical with those in the single hoe. In the place of the straps 14 are two looped straps 34 having both of their ends connected to the handle 30. These looped straps 34 are connected to U-shaped straps 34a having forward inturned ends. The manner of attachment between the straps 34 and 34a is shown in Figure 2. The looped straps 34 are provided with slots 35 which receive bolts having thumb nuts 36, the purpose of this construction being to provide for lateral adjustment of the rotary chopping reel on the implement frame. The rotary chopping reels themselves are identical in structure with those of the single hoe type. Where it is desired to cultivate the full width of the strips of soil between rows, the hoes may have the same width as the hoe 19. In cultivating adjacent strips by straddling the row it is generally customary to cultivate only part of the strip, leaving the other part to be cultivated when the implement straddles the adjacent row. The width of the rotary chopping reel, however, is immaterial since it may be built in any width to meet the desired conditions.

Extending rearwardly from the straps 34a are U-shaped straps 37 which serve as supports for the cultivating tools 38. In order to support the cultivating tools 39, supports 40 are provided, these being in the form of Z-shaped straps secured to the straps 37. By this means the cultivating tool 39 is in the rear of the cultivating tool 38. Secured to each strap 40 is a strap 41, the two straps 41 meeting immediately beneath the handle 30 as shown in Figure 4. The brace 42 is secured at its upper extremity to the handle 30 and it is provided with notches or with a plurality of apertures for providing a vertical adjustment of the straps 41.

With the double implement shown in Figures 2 and 4 and as above described, it is possible to straddle a row of plants and to cultivate on both sides thereof. When the plants are small the two rotary hoes may be adjusted toward each other so as to leave a small space between them. With the larger plants and especially with those of larger leaves, it is desirable that the two rotary hoes be spaced a greater distance apart to not only avoid the unnecessary labor of cultivating beneath the leaves but so as to prevent injury to the plants.

As before stated the rotary chopping reels with their immediate frames are identical in both the single and the double forms. The inturned ends 16 support the flat blade 26 in rigid relation while in the double form the inturned ends of the straps 34a support the flat hoes 42 in a like manner. In the double form of hoe the rotary chopping reel consists of a pair of spiders 43 with obliquely positioned blades 44 connecting the spiders. The relationship between the rotary chopping reel itself and the flat hoe 42 as well as the relationship between the rotary chopping reel and the cutivating tools 38 and 39 is identical with the similar relationships in the single hoe. The leaf guards 45 are similar to the leaf guards 39 and they function in the same manner. Owing to the more confined space for pivotal movement in the double hoe, the leaf guards 45 may generally be made somewhat smaller than the leaf guards 29. The leaf guards on the outer sides of the two hoes in the double form of implement may generally be removed entirely except when the space between rows of plants is but very little greater than the width of the hoes.

Having thus described my invention in such full, clear, and exact terms that its construction and operation will be readily understood by others skilled in the art to which it pertains, what I claim as new and desire to secure by Letters Patent of the United States is:

1. An implement including a rotary member adapted to be rolled over the surface of the soil, a push handle having a pair of fork members at the lower end portion thereof, said fork members straddling said rotary member, said rotary member being journalled to said fork members, the extremities of said fork members being inturned, and a U-shaped mulching hoe secured to said fork members and to said rotary member at the axis of the journal thereof, the end portions of said mulching hoe being seated against the inturned end portions of said fork members.

2. An implement including a rotary member adapted to be rolled over the surface of the soil, a push handle having a pair of fork members at the lower end portion thereof, said fork members straddling said rotary member, said rotary member being journalled to said fork members, the extremities of said fork members being inturned, a U-shaped mulching hoe secured to said fork members and to said rotary member at the axis of the journal thereof, the end portions of said mulching hoe being seated against the inturned end portions of said fork members, and means for adjustably spacing said mulching hoe from the periphery of said rotary member.

3. An implement including a rotary member adapted to be rolled over the surface of the soil in either of two opposite directions, a push handle having a pair of fork members at the lower end portion thereof for straddling said rotary member, said rotary member being journalled to said fork members, the extremities of said fork members being inturned, and a U-shaped mulching hoe secured to said fork members and to said rotary member at the axis of the journal thereof and having an angular relationship with said fork members, the end portions of said mulching hoe being seated against the inturned end portions of said fork members, the mulching hoe being operative in one direction of propulsion and inoperative in the other direction.

In testimony whereof I affix my signature.

CHARLES D. AMMON.